United States Patent

[11] 3,573,482

| [72] | Inventors | Kenneth R. Brooks<br>Dexter;<br>Jacques Mosier, Ypsilanti, Mich. |
|---|---|---|
| [21] | Appl. No. | 840,650 |
| [22] | Filed | July 10, 1969 |
| [45] | Patented | Apr. 6, 1971 |
| [73] | Assignee | Ford Motor Company<br>Dearborn, Mich. |

[54] ELECTRIC FUEL PUMP CONTROL CIRCUIT
7 Claims, 1 Drawing Fig.

[52] U.S. Cl. ................................................. 290/38, 123/179
[51] Int. Cl. ................................................. F02n 11/00
[50] Field of Search ................................ 290/36, 37, 38; 179/(B), (Big), (Inquired), 136

[56] References Cited
UNITED STATES PATENTS

| 2,218,847 | 10/1940 | Korte et al. | 123/179(BIG) |
|---|---|---|---|
| 2,370,249 | 2/1945 | Korte et al. | 123/179(BIG) |
| 2,912,595 | 11/1959 | Kehm et al. | 290/36 |
| 2,989,644 | 6/1961 | Schultz | 290/36 |
| 3,476,949 | 11/1969 | Ballou | 290/36 |
| 3,502,895 | 3/1970 | Ballou | 123/179(BIG) |

*Primary Examiner*—G. R. Simmons
*Attorneys*—John R. Faulkner and Keith L. Zerschling

ABSTRACT: An electric fuel pump control circuit for an electric fuel pump that furnishes fuel for an internal combustion engine in which electrical energy is supplied to the fuel pump during starting operations from the electrical storage battery of the internal combustion engine and during normal running operations, after starting operations have been terminated, is supplied from one of the output windings of an alternator which is operated by the internal combustion engine. The electric fuel pump is energized, during starting operations, by battery and system voltage and subsequent to starting operations is energized from the alternator output windings at an average voltage of substantially half the battery and system voltage and at a peak voltage which is proportional to engine speed.

Patented April 6, 1971
3,573,482
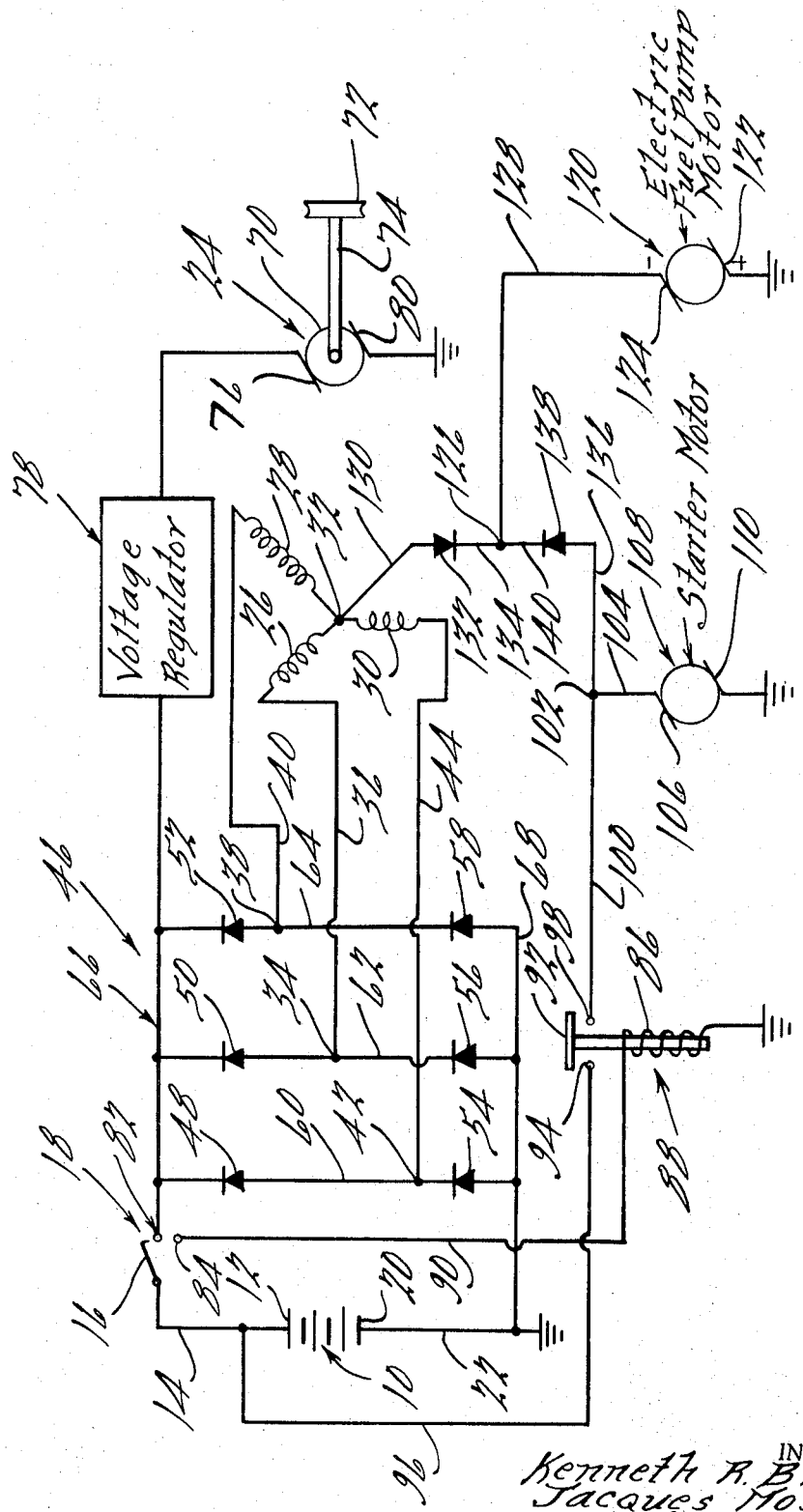
INVENTORS.
Kenneth R. Brooks
Jacques Mosier
BY John R. Faulkner
Keith L. Zerschling
ATTORNEYS.

ELECTRIC FUEL PUMP CONTROL CIRCUIT

BACKGROUND OF THE INVENTION

Electric fuel pump systems for internal combustion engines have long been known in the art. The conventional electric fuel pump system comprises a DC electric motor which drives a small pump. This pump is employed to convey fuel from the fuel tank of the internal combustion engine to a carburetor float bowl. The motor for the pump is conventionally energized from the electric storage battery and the controlled output from a generator of direct current voltage. Consequently, the motor is energized by connecting it directly to the electrical energy source for the internal combustion engine.

As a result, during starting operations, the motor for the fuel pump is energized by a low voltage which occurs during starting operations and during normal operations, it is energized at a substantially constant higher voltage that comes from the regulated electrical system for the engine. This type of system suffers from the disadvantage that, if adequate fuel delivery during starting operations, particularly during starting operations at extremely low temperatures, is accomplished, fuel under excessive pressure is supplied by the fuel pump during normal operations. In order to deal with such a problem, complicated bypass circuits and relief valves must be incorporated within the fuel pumping circuit with attendant increases in complexity and cost.

SUMMARY OF THE INVENTION

The present invention provides an electric fuel pump control circuit having an electric motor which includes a winding designed to provide adequate fuel delivery from the fuel tank to the carburetor of an internal combustion engine at minimum battery voltages which occur during cold weather starting operations. Means are provided for energizing the winding of the electric motor directly from the electrical storage battery and electrical system of the internal combustion engine when the starter motor of the internal combustion engine when the starter motor of the internal combustion engine is energized. This provides sufficient electrical energy to the fuel pump during minimum battery voltages, which occur during cold weather starting, to supply sufficient fuel to the engine. When the starting operations for the internal combustion engine are completed or terminated and the starter motor is not longer energized, circuit means are included for energizing the electric motor that drives the fuel pump from the output windings of an engine driven alternator. This alternator is conventional and is used to supply electrical energy to the electrical storage battery of the engine and to other associated electrical loads. This circuit is connected so that it supplies electrical energy at a selected fraction of the energy available from the electrical storage battery and the vehicle electrical system during normal running operations. When a Wye connected alternator is employed, which has output windings connected so that a neutral point is available, this circuit is connected to this neutral point and to the electric motor of the fuel pump. As a consequence, the electric motor of the fuel pump is energized at an average voltage of approximately half of the full battery voltage and the full system voltage, and at a peak voltage that varies with engine speed.

With a Wye connected alternator, the electric motor of the fuel pump has one terminal connected to the neutral point of the Wye through a diode which is poled to transfer electrical energy from this neutral point to this terminal of the electric motor. A diode is also connected in the electrical circuit for the starter motor and is connected to one terminal of the starter motor, to the other diode and to the terminal of the electric motor for fuel pump mentioned above. This diode is poled in the opposite direction from the first-mentioned diode. Thus during starting operations, when the starting circuit for the starter motor is closed, the electric fuel pump is energized directly from the electrical storage battery and the electrical system of the internal combustion engine through this starting circuit and through the second-mentioned diode. After starting operations have been terminated, the electric motor for the fuel pump is energized from the neutral point of the Wye connected alternator output windings through the first mentioned diode and through the rectifier diodes for the alternator output windings. This voltage has an average value of substantially one-half of the system and battery voltage and a peak value that varies substantially proportionally with engine speed. The peak value of this rectified output voltage controls the speed of the electric motor of the fuel pump, and thus the speed of the fuel pump and the amount of fuel supplied to the engine increases proportionally to engine speed and the demand of the engine for fuel.

The advantages of the present invention over conventional electric fuel pump systems that operate directly from the electrical storage battery and the electrical system of an internal combustion engine include the following:

1. the electric motor and the fuel pump stop when the engine stops since the electric motor is supplied energy from the alternator output windings during normal operations;
2. the system assures adequate delivery of fuel during cold start operations since the winding of the motor for the electric fuel pump is designed to provide adequate fuel delivery at minimum battery voltages;
3. there is no excessive fuel pressure during normal operations since the winding of the electric motor that drives the fuel pump receives electrical energy at an average voltage of substantially one-half the battery voltage and the system voltage of the internal combustion engine;
4. the electric fuel pump has higher output capability at higher engine speeds since it receives energy from the output windings of the alternator which deliver electrical energy at an increasing peak voltages as the engine speed increases;
5. the electric motor of the fuel pump consumes less power, is quieter, and has a longer life than conventional fuel pumps operated by conventional electric fuel pump control circuits.

The present invention, therefore, provides an electric fuel pump control circuit which provides electrical energy to an electric motor of a fuel pump in a way that meets all engine demands for fuel under all electrical system conditions without delivering an oversupply of fuel under excessive pressure.

BRIEF DESCRIPTION OF THE DRAWING

The single FIG. of the drawing shows an electrical circuit diagram of the electrical fuel pump control circuit of the present invention.

DESCRIPTION OF THE PREFERRED EMBODIMENT

Referring now to the single FIG. of the drawing, there is shown a source of direct current electrical energy in the form of an electrical storage battery 10 having one terminal thereof, a positive terminal 12, connected through lead 14 to a movable blade 16 of an ignition switch 18. The other terminal of the electrical storage battery 10, the negative terminal 20, is connected to ground through lead 22. An engine driven alternator 24 has a plurality of output windings 26, 28 and 30 connected at a neutral point 32. This connection of the alternator output windings is known in the art as a Wye connected alternator having a neutral point at 32. The other end of the output winding 26 is connected to a terminal 34 through lead 36, the other end of output winding 28 is connected to a terminal 38 through lead 40, and the other end of output winding 30 is connected to terminal 42 through lead 44.

The terminals 34, 38 and 42 are connected to a rectifier system 46 which comprises a plurality of unilateral conducting devices or diodes 48, 50, 52, 54, 56 and 58. The anode and cathode of the diodes 48 and 54, respectively, are connected through lead 60 to terminal 42, the anode and cathode of diodes 50 and 56, respectively, are connected to the terminal 34 through lead 62, and the anode and cathode of diodes 52 and 58 are connected to terminal 38 through lead 64. The cathodes of diodes 48, 50 and 52 are connected to a positive DC output line or terminal 66 and the anodes of diodes 54, 56 and 58 are similarly connected to a negative DC output line or terminal 68. This line or terminal 68 is connected to lead 22 and hence to ground.

The alternator 24 also includes a rotatably driven field winding 70 which is driven via a pulley 72 and shaft 74 from the internal combustion engine (not shown) of the present invention. One terminal 76 of the field winding 70 is connected to line or terminal 66 through a conventional voltage regulator 78, while the other terminal 80 of the field winding 70 is connected to ground.

The ignition switch 18 includes an "on" terminal 82 and a "start" terminal 84. The "start" terminal 84 is connected to one terminal of a winding 86 of a starter relay 88 through a lead 90, and the other terminal of winding 86 is connected to ground. The relay 88 also includes an electrically conductive armature 92, constructed of ferromagnetic material, which is in the position shown in the drawings when the winding 86 is not energized. The relay 88 also includes a first stationary contact 94 connected to lead 14 through lead 96 and a second stationary contact 98 connected through lead 100, junction 102 and lead 104 to one terminal 106 of starter motor 108 for the internal combustion engine (not shown). The other terminal of the starter motor, terminal 110, is connected to ground.

The electric fuel pump motor of the present invention is designated generally by the numeral 120 and it has one terminal 122 connected to ground and the other terminal 124 connected to a junction 126 through lead 128. The junction 126 is in turn connected to the neutral point 32 of the output windings of alternator 24 through a lead 130, a unilateral conducting device or diode 132 and a lead 134. This unilateral conducting device 132 is poled so that current may flow from the neutral point 32 to the junction 126 and hence to the terminal 124 of the electric motor 120 for the fuel pump. The junction 102 is connected to junction 126 through lead 136, unilateral conducting device or diode 138 and lead 140. This unilateral conducting device or diode 138 is poled so that current may flow from the junction 102 to junction 126 and hence to terminal 124 of the electric fuel pump motor 120 through lead 128.

OPERATION

When the movable blade 16 of the ignition switch 18 is moved into contact with the "on" and "start" terminals 82 and 84 of the ignition switch 18 during starting operations, electrical energy from the storage battery 10 is delivered to the winding 86 of starter relay 88 through lead 90 thereby moving the armature 92 of relay 88 into engagement with stationary contacts 94 and 98. This completes an electrical circuit from the positive terminal 12 of the electrical storage battery 10 through lead 96, stationary contact 94, armature 92, stationary contact 98, lead 100, junction 102 and lead 104 to the terminal 106 of the starter motor 108. As a result of the energization of starter motor 108, the internal combustion engine (not shown) of the present invention is cranked to initiate starting operations. At the same time, electrical energy is delivered to the terminal 124 of the electric motor 120 of the fuel pump from the junction 102 through lead 136, unilateral conducting device or diode 138, lead 140, junction 126 and lead 128 thereby energizing the electric motor 120 of the fuel pump directly from the electrical storage battery 10 and applying full storage battery voltage across the terminals of the fuel pump motor 120. At this time, the unilateral conducting device or diode 132 connected to the junction 126 prevents current flow to the output windings 26, 28 and 30 of the alternator 24.

When the internal combustion engine (not shown) of the invention has started, due to the cranking by the starter motor 108, the operator of the vehicle will move the movable blade 16 of the ignition switch 18 out of contact with stationary terminal 84 of the ignition switch 18 thereby deenergizing winding 86 of the starter relay 88. This action will move the armature 92 of relay 88 out of contact with stationary contacts 94 and 98 and will break the circuit to the starter motor 108 and the electric fuel pump motor 120.

During starting operations, the movable blade 16, as stated above, of the ignition switch 18 is in contact with stationary "on" terminal 82 thereby applying battery voltage to the field winding 70 of the alternator 24 through lead 14, movable blade 16, stationary "on" terminal 82, lead 66 and voltage regulator 78. As a result, during starting operations, the alternator output windings 26, 28 and 30 will commence to produce electrical energy. After starting operations have been completed, the movable blade 16 of the ignition switch 18 will still be in contact with the stationary "on" terminal 82 and the alternator output windings 26, 28 and 30 will supply electrical energy to the terminals 66 and 68 of the rectifier 46 through the diodes 48, 50, 52, 54, 56 and 58. As is conventional, this electrical energy is fed to the electrical energy storage battery 10 and to the field winding 70 of the alternator through the voltage regulator 78 thereby maintaining the output voltage of the alternator 24 at some limited selected level.

At this time, electrical energy is fed to the terminal 124 of the electric fuel pump motor 120 from the neutral point 32 of the alternator output windings 26, 28 and 30. This is accomplished through lead 130, unilateral conducting device or diode 132, lead 134, junction 126 and lead 128. Since the other terminal 122 of the electric fuel pump motor 120 is connected to ground and hence to the anodes of diodes 54, 56 and 58 of the rectifier 46, the energy delivered to the electric fuel pump motor 120 will be halfway rectified, three-phase wave form which has a peak ripple value that increases with alternator speed and has an average voltage, i.e., the voltage at the neutral point 32 of approximately one-half of the voltage of the electrical storage battery 10. The unilateral conducting device or diode 132 isolates the electric fuel pump 120 from the output windings 26, 28 and 30. Thus, only the peak effective voltage of the half-wave rectified three-phase wave form is applied to the electric fuel pump motor 120 and this causes the speed of the electric fuel pump motor to vary proportionally with engine speed. This is true since the magnitude of the internally generated voltages in the output windings 26, 28 and 30 increases proportionally to the speed of the field winding 70 to overcome the inductive impedance of these output windings that increases proportionally with the frequency or speed of the field winding 70. This effect, however, does not appear at the terminals 66 and 68 of the rectifier 46.

In addition, during engine operating conditions, the diode or unilateral conducting device 138 acts as a "freewheeling diode" thereby providing a return path for the electric fuel pump motor 120 induced e.m.f. which, of course, is in the opposite direction or of the opposite polarity from the voltage supplied by the output windings 26, 28 and 30. The return path for the current produced by this induced back e.m.f. is through terminal 122 of the electric fuel pump motor, ground, terminal 110 of starter motor 108, starter motor 108, terminal 106, lead 104, junction 102, lead 136, diode 138, junction 126 and lead 128 to terminal 124. It can be appreciated that diode 132 blocks this current from the output windings 26, 28 and 30 of the alternator 24.

It is known to those skilled in the art that during cold starting operations, i.e., those that occur during cold weather, the battery voltage or the terminal voltage across the electrical storage battery 10 drops to a very low value. The winding of the electric fuel pump motor 120 is designed to provide adequate fuel delivery to the internal combustion engine at these low battery voltages. It is apparent that such a winding would produce excessive fuel pressure at the internal combustion engine if full battery voltage and full system voltage that appears across the terminals 12 and 20 of the electric storage battery 10 and across the output terminals 66 and 68 of the rectifier 46 were delivered to the electric fuel pump motor after starting and during normal engine running conditions. With the control circuit described above, after the internal combustion engine starts, the current voltage applied from the alternator stator neutral, i.e., the average voltage, is approximately one-half battery voltage thereby eliminating the problem of excessive fuel pressure.

The system described above also has a built-in safety feature. The electric fuel pump motor stops as soon as the internal combustion engine stops since the potential at the neutral point 32 of the output windings 26, 28 and 30 drops to zero, when the alternator field winding 70 is no longer rotated.

The present invention thus provides an electric fuel pump control circuit in which the fuel pump stops when the engine stops, adequate fuel is delivered during cold starting operations, there is no excessive pressure of fuel during normal operations, and the fuel pump speed is varied proportional to engine speed thereby increasing the amount of fuel delivered to the internal combustion engine in accordance with its requirements. The system of the present invention also provides low power consumption, long life and quiet operation. In summary, the fuel pump control circuit of the present invention controls an electric fuel pump so that a proper amount of fuel is delivered to an internal combustion engine to meet all engine requirements under all electrical system conditions.

We claim:

1. In an electric fuel pump system for an internal combustion engine the combination comprising an electric fuel pump motor, an electrical storage battery, an alternator having a plurality of output windings, rectifier means coupling said output windings and said electrical storage battery, a starting motor, and means for energizing said electrical fuel pump directly from said battery when said starter motor is energized, said output windings of said alternator being Wye connected, a unilateral conducting means connecting one terminal of said electrical fuel pump to the neutral point of said windings and means connecting the other terminal of said electric fuel pump to one terminal of said rectifier and said electrical storage battery.

2. The combination of claim 1, in which said one terminal of said electric fuel pump motor is connected to said starting motor through a second unilateral conducting means poled in the opposite direction from said first-mentioned unilateral conducting means.

3. In an electric fuel pump system for an internal combustion engine the combination comprising an electric fuel pump motor, an electrical storage battery, an alternator having a plurality of output windings, rectifier means coupling said output windings and said electrical storage battery, a starting motor, electrical-switching means when actuated coupling said electrical storage battery with said starter motor, and means coupled to said electrical-switching means, said output windings and said electric fuel pump motor for energizing said fuel pump from said battery when said electrical-switching means is actuated, said output winding of said alternator being Wye connected, a unilateral conducting means connecting one terminal of said electric fuel pump to the neutral point of said windings and means connecting the other terminal of said electric fuel pump to one terminal of said rectifier and said electrical storage battery.

4. The combination of claim 3 in which said one terminal of said electric fuel pump is connected to said starting motor through a second unilateral conducting means poled in the opposite direction from said first-mentioned unilateral conducting means.

5. In an electric fuel pump system for an internal combustion engine, the combustion comprising an electric fuel pump motor, an electrical storage battery, an alternator having a plurality of Wye connected output windings including a neutral point and a rectifier means coupled to said output windings and said electrical storage battery, a starter motor for the internal combustion engine, an electrical circuit means coupled to said source of electrical energy and said starter motor for energizing said starter motor from said electrical storage battery during engine starting operations, and means coupled to said electrical circuit means, said electrical fuel pump motor and said rectifier for energizing said electric fuel pump motor with a voltage having an average value of about one-half the voltage of the electric storage battery and a peak voltage that increases as a function of engine speed after starting operations have been terminated and the internal combustion engine is in operation, said last-mentioned means includes a unilateral conducting means connected to said neutral point and one terminal of electrical fuel pump motor, the other terminal of said electric fuel pump motor being connected to one terminal of the said rectifier and one terminal of said electrical storage battery.

6. The combination of claim 5 in which said last-mentioned means includes a second unilateral conducting means connected between one terminal of said starter motor and said one terminal of said electric fuel pump motor, said second unilateral conducting means being poled in the opposite direction from said first-mentioned unilateral conducting means, and the other terminal of said starter motor being connected to said other terminal of said electric fuel pump motor.

7. The combination of claim 6 in which said one of said terminals of said electric fuel pump motor is connected to like polarity electrodes of said unilateral conducting means.